United States Patent [19]

Ghosh et al.

[11] Patent Number: 5,730,928
[45] Date of Patent: Mar. 24, 1998

[54] METHOD OF MAKING AIR LUBRICATED HYDRODYNAMIC CERAMIC BEARINGS

[75] Inventors: Syamal K. Ghosh; Dilip K. Chatterjee; David Alan Ash, all of Rochester, N.Y.

[73] Assignee: Eastman Kodak Company, Rochester, N.Y.

[21] Appl. No.: 701,895

[22] Filed: Aug. 23, 1996

[51] Int. Cl.⁶ .................................................. C04B 35/48
[52] U.S. Cl. .......................... 264/629; 264/632; 264/667; 264/678
[58] Field of Search ............................... 264/60, 67, 629, 264/632, 667, 678

[56] References Cited

U.S. PATENT DOCUMENTS

| | | |
|---|---|---|
| 2,624,097 | 1/1953 | Kistler . |
| 3,721,480 | 3/1973 | Dee .................................. 308/9 |
| 4,579,705 | 4/1986 | Matsuoka et al. ................ 264/67 |
| 4,728,201 | 3/1988 | Abbe . |
| 4,754,494 | 6/1988 | Kumar . |
| 4,759,644 | 7/1988 | Mizukusa et al. . |
| 4,883,367 | 11/1989 | Maruyama ..................... 384/114 |
| 4,884,899 | 12/1989 | Schwartzman ................ 384/100 |
| 5,076,716 | 12/1991 | Mizobuchi et al. . |
| 5,083,873 | 1/1992 | Momose et al. . |
| 5,173,229 | 12/1992 | Miyamoto ....................... 264/67 |
| 5,224,782 | 7/1993 | Miwa et al. . |
| 5,336,282 | 8/1994 | Ghosh et al. . |
| 5,358,913 | 10/1994 | Chatterjee et al. . |

*Primary Examiner*—James Derrington
*Attorney, Agent, or Firm*—Clyde E. Bailey, Sr.

[57] ABSTRACT

A method of making a hydrodynamic ceramic bearing includes the steps of providing ceramic powder comprising a first concentration of particulate aluminum oxide and a second concentration of particulate zirconium oxide alloy. The zirconium oxide alloy consists essentially of zirconium oxide and a the group consisting of MgO, CaO, $Y_2O_3$, $Sc_2O_3$, and rare earth oxides. The zirconium oxide alloy has a concentration of the secondary oxide of, in the case of $Y_2O_3$, about 0.5 to about 5 mole percent; in the case of MgO, about 0.1 to about 1.0 mole percent, in the case of $CeO_2$, about 0.5 to about 15 mole percent, in the case of $Sc_2O_3$, about 0.5 to about 7.0 mole percent and in the case of CaO from about 0.5 to about 5 mole percent, relative to the total of the zirconium oxide alloy, the compacting further comprising forming a blank. A mold is provided for receiving and processing the ceramic powder thereby forming a ceramic billet. Shaping of the ceramic billet is undertaken to form a near net-shaped ceramic bearing. Thereafter, the near net-shaped ceramic bearing is sintered resulting in a sintered ceramic bearing. After sintering, the ceramic bearing is further shaped or machined. After forming the ceramic bearing, at least two air inlet ports are formed in the body portion of the bearing in fluid communication with air channels having preferably a spiral pattern formed in at least one flange portion of the bearing.

10 Claims, 4 Drawing Sheets

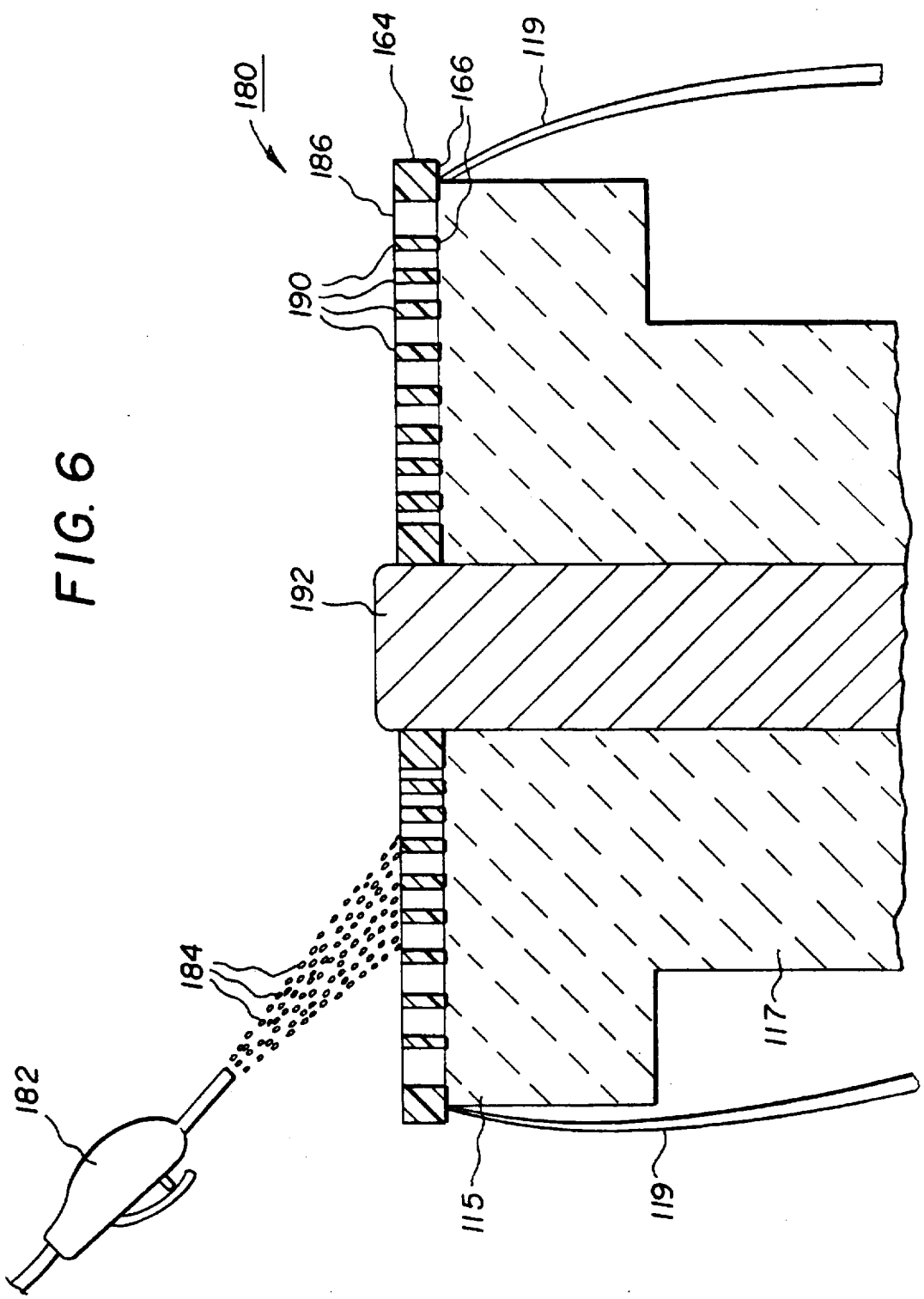

METHOD OF MAKING AIR LUBRICATED HYDRODYNAMIC CERAMIC BEARINGS

CROSS-REFERENCE TO RELATED APPLICATIONS

This application is related to the following concurrently fled applications: (a) Ser. No. 08/701,944 for "Air Lubricated Hydrodynamic Ceramic Bearings" by Dilip K. Chatterice, Syamal K. Ghosh and Theodore R. Kolb; (b) Ser. No. 08/701,824 for "Method of Engraving Pre-sintered Ceramic Articles", by Dilip K. Chatterjee, Syamal K. Ghosh and Badhri-Narayan; and (c) Ser. No. 08/697,325 for "Method of Forming a Mask Useful for Engraving Ceramic Articles" by Dilip K. Chatterjee, Syamal K. Ghosh and Mark D. Bedzyk.

TECHNICAL FIELD

This invention relates generally to a method of making hydrodynamic bearings, and more particularly, the invention concerns a method of making high precision tetragonal zirconia polycrystal (TZP) ceramic hydrodynamic bearing assemblages which are more durable and wear resistant, and can be cost effectively manufactured.

BACKGROUND OF THE INVENTION

Air-lubricated hydrodynamic bearings are known to be promising candidates for various high precision applications such as rotary scanners and VTR head assemblies for high recording densities, and flying spot laser sensitometers for high precision sensitometry. There are two different types of gas-lubricated bearings: externally pressurized (hydrostatic), and self-acting (hydrodynamic). Hydrostatic bearings can carry higher loads, but need external pressure supply. In hydrostatic bearings the pressure is generated through the motion of bearing surfaces. These bearings are most suitable for applications with light loads and high speeds. Advantages that air lubricated hydrodynamic bearings have over other type of bearings generally include their simplicity of design, high accuracy, low flutter (speed variation), high stiffness, low vibration, low wear, long life (even at high speeds), contamination-free from lubricants, and wide use temperatures.

Conventional air bearings, however, have several undesirable shortcomings. It is well known that they require high precision manufacturing which increases the product cost. Moreover, these bearings take up more room than conventional ball bearings. Notwithstanding the stringent specification requirements imposed by product designers, air bearings are nonetheless still required in specific applications. It is also known that conventional air bearings require impact resistance to eliminate catastrophic failures and corrosion, and wear and abrasion resistance to improve service life and productivity. Thus, conventional air bearings made of, for instance, metals or alloys, most commonly steel, meet some of these requirements but have considerable limitations of requiring frequent maintenance due to wear.

Experience indicates that yttria-doped tetragonal zirconia polycrystal (Y-TZP) ceramic materials offer many advantages over conventional materials, including many other ceramics. Y-TZP is one of the toughest ceramics. The toughness is achieved at the expense of hardness and strength. Tetragonal zirconia alloy-alumina composite, that is, the product of sintering a particulate mixture of zirconia alloy and alma, is another tough and relatively soft structural ceramic composite. Y-TZP ceramic and zirconia-alumina composites have tribological properties that are not as attractive as other high performance structural ceramics like SiC and $Si_3N_4$. An example of a material having good hardness and strength is monolithic cubic spinel, however, this material is highly brittle and is unusable for structural applications.

It is further known that a bearing assemblage having a bearing surface in rotating contact with a shaft has a longer service life and better performance if made with a hard material and the mating surfaces have low coefficient of friction.

An alternative approach is taught by U.S. Pat. No. 5,358,913; which is hereby incorporated herein by reference. In that approach, a tetragonal zirconia alloy article, which can be near net-shape, is compacted and then sintered in the presence of an MgO, CaO, $Y_2O_3$, $Sc_2O_3$, $Ce_2O_3$, or other rare earth oxide dopant to produce an article having a tetragonal core and a cubic case. The dopant can be provided in a number of different forms such as a solid plate, a powder, or a layer produced by decomposition of an organo-metallic precursor film. In U.S. patent application No. 07/994,820 now abandoned in favor of Continuation-in-Part application Ser. No. 08/231,870, fled Apr. 25, 1994; a method is described for producing articles having a tetragonal zirconia alloy core and a monoclinic case. In U.S. patent application No. 07/994,818 now abandoned in favor of a Continuation-in-Part application U.S. Ser. No. 08/400,416, hereby incorporated herein by reference; a method is described for producing articles having a tetragonal zirconia alloy and α-alumina core and a case of tetragonal zirconia and cubic spinel. In the core and the case the predominant species is tetragonal zirconia. The application also teaches a method for producing articles having a core that is tetragonal zirconia alloy along with less than about 5 weight percent alumina and having a case that is cubic phase zirconia and cubic spinel ($MgO-Al_2O_3$). Alpha-phase alumina is harder than tetragonal zirconia. Spinel is harder than co-alumina and about as hard as cubic zirconia.

As will be more completely disclosed, the method of our invention applies to a hydrodynamic bearing assemblage, i.e., a complete set of stationary bearing and rotating shaft made of ceramics or a complete set of rotating bearing and stationary shaft made of ceramics, particularly one member of assemblage made of Y-TZP. Although some prior art suggested use of ceramics, for instance, Miwa et al, U.S. Pat. No. 5,224,782, none of those prior art teaches the use of ceramics for both components of the shaft and the bearing assembly. Miwa et at. discloses a hydrodynamic bearing with a sliding surface coated with a thin layer of perfluoropolyethers lubricant. In the hydrodynamic bearing and rotating shaft assemblage, the shaft can come into direct contact with the inner surface of the bearing body at the starting and stopping of the bearings. The direct contact of the shaft and bearing can also occur if there is a large mount of imbalances in the rotation of the shaft. Air friction at the bearing/shaft assembly at very high rotational speeds (of the order of 3,000 to 6,000 rpm) can often cause temperature increase in the bearings and subsequent dimensional changes, which in turn interferes with its operation. Proper choices of ceramics in manufacturing these bearings are essential to overcome the problems described above.

Therefore, a need persists for a method of making high precision ceramic hydrodynamic bearing assemblies that have superior wear and abrasion resistance while being cost effective and easy to manufacture.

SUMMARY OF THE INVENTION

It is, therefore, an object of the invention to provide a method of making ceramic hydrodynamic bearing that is reliable, simple to use and cost effective to manufacture.

Another object of the invention is to provide a method of making ceramic hydrodynamic bearing assemblages having both a rotating shaft and stationary bearing or a stationary shaft and a rotating bearing.

It is a feature of the invention that a method for making ceramic hydrodynamic bearing uses tetragonal zirconia ceramic material (Y-TZP) for manufacturing of either the stationary bearing/rotating shaft or the rotating bearing/stationary shaft in a cost effective way. One of the members of the bearing-shaft assembly is made of tetragonal zirconia ceramic whereas the other member is alumina or zirconia-alumina composites or any structural ceramics like silicon nitride and silicon carbide.

Accordingly, for accomplishing these and other objects, features and advantages of the invention, there is provided, in an aspect of the invention, a method of making a hydrodynamic ceramic bearing which includes the step of providing ceramic powder comprising a first concentration of particulate aluminum oxide and a second concentration of particulate zirconium oxide alloy. The zirconium oxide alloy consists essentially of zirconium oxide and a secondary oxide selected from the group consisting of MgO, CaO, $Y_2O_3$, $Sc_2O_3$, and rare earth oxides. Moreover, wherein zirconium oxide alloy has a concentration of said secondary oxide of, in the case of $Y_2O_3$, about 0.5 to about 5 mole percent; in the case of MgO, about 0.1 to about 1.0 mole percent, in the case of $CeO_2$, about 0.5 to about 15 mole percent, in the case of $Sc_2O_3$, about 0.5 to about 7.0 mole percent and in the case of CaO from about 0.5 to about 5 mole percent, relative to the total of said zirconium oxide alloy, said compacting further comprising forming a blank. A mold is provided for receiving and processing the ceramic powder. The ceramic powder is then compacted in the mold provided to form a ceramic billet. The ceramic billet is then shaped or machined so as to form a near net-shaped ceramic bearing having opposing flange portions and a body portion between the opposing flange portions. In this embodiment of the invention, after the initial shaping, the near net-shaped green ceramic bearing is sintered thereby forming a sintered ceramic bearing. The ceramic bearing is then further machined or shaped. After shaping the ceramic bearing, at least two air inlet ports are formed in the body portion of the bearing in fluid communications with air channels, having preferably a spiral pattern, formed in at least one flange portion of the bearing.

It is, therefore, an advantage of the invention that the method for making ceramic hydrodynamic bearings is reliable, easy to use, cost effective and efficient to practice. Moreover, air lubricating hydrodynamic bearings made with the method of the invention imparts low cost to the product, while having characteristically high reliability, a longer life, easier manufacturability, and improved wear and abrasion resistance.

BRIEF DESCRIPTION OF THE DRAWINGS

The above mentioned and other objects, features and advantages of the invention and the manner of attaining them will become more apparent and the invention itself will be better understood by reference to the following description of an embodiment of the invention taken in conjunction with the accompanying drawings, wherein:

FIG. 6 is a schematic of a device for bead blasting a spiral pattern through a polyester mask made by the method of the invention.

DETAILED DESCRIPTION OF THE INVENTION

Figure 1:
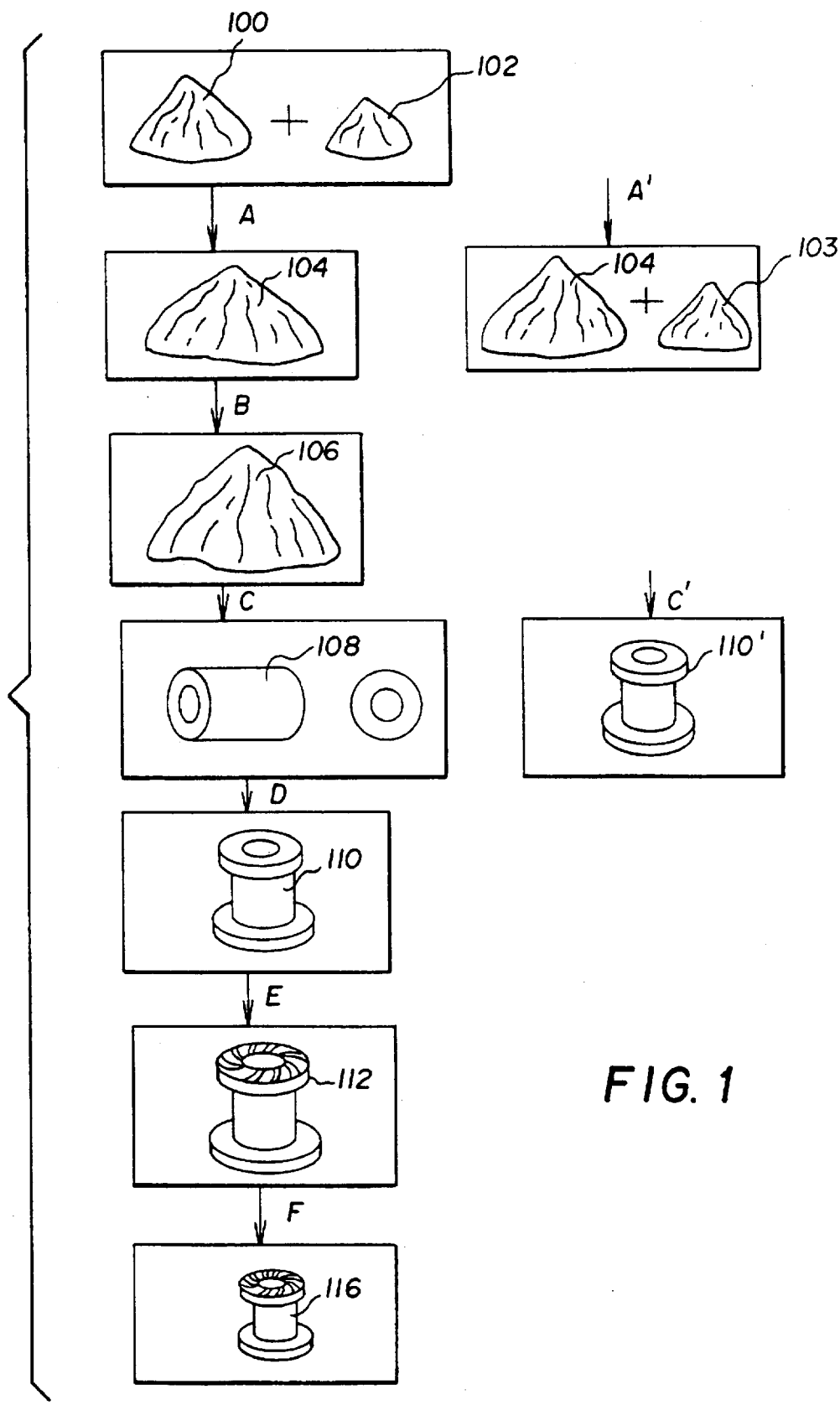
FIG. 1 is a schematic flow diagram of the method of the invention.

In the method of the invention, broadly illustrated in FIG. 1 (Steps A–F), ceramic powder comprising of primarily zirconium oxide, or a first concentration of particulate aluminum oxide and a second concentration of particulate zirconium oxide alloy is used for making hydrodynamic ceramic bearings, as discussed fully below. A typical hydrodynamic bearing 116 made in accordance with the method of the invention is illustrated in FIGS. 1 (Step F) and 3. The zirconium oxide alloy consists essentially of zirconium oxide and a secondary oxide selected from the group consisting of MgO, CaO, $Y_2O_3$, $Sc_2O_3$, and rare earth oxides. Moreover, the zirconium oxide alloy has a concentration of the secondary oxide of, in the case of $Y_2O_3$, about 0.5 to about 5 mole percent; in the case of MgO, about 0.1 to about 1.0 mole percent, in the case of $CeO_2$, about 0.5 to about 15 mole percent, in the case of $Sc_2O_3$, about 0.5 to about 7.0 mole percent and in the case of CaO from about 0.5 to about 5 mole percent, relative to the total of said zirconium oxide alloy, said compacting further comprising forming a blank. A mold is provided for receiving and processing the ceramic powder. The ceramic powder is then compacted (as described below) in the mold provided to form a ceramic billet. The ceramic billet is then shaped or green-machined so as to form a near net-shaped green ceramic bearing having opposing flange portions and a body portion between the opposing flange portions. In this embodiment of the invention, after the initial shaping, the green ceramic bearing is sintered thereby forming a sintered net-shape ceramic bearing, as described more fully below. The ceramic bearing is then further machined or shaped, as indicated below. After shaping the ceramic bearing, at least two air inlet ports are formed in the body portion of the bearing in fluid communications with air channels, having preferably a spiral pattern, formed in at least one flange portion of the bearing.

CERAMIC POWDER MATERIAL MIXING

According to FIG. 1, step "A" diagrammatically illustrates the alloying process. Zirconia powder 100 is combined with one or more secondary oxide powders 101 to provide zirconia alloy powder 104. The preparation of zirconia alloys is well known to those skilled in the art and zirconia alloys are available commercially. For example, particulate zirconia alloy having 3 mole percent $Y_2O_3$ is marketed by Z-TECH Corporation, Bow, N.H., as "SYP-ULTRA 5.2 Yttria Stabilized Zirconia".

More particularly, we prefer using tetragonal zirconia ceramic material for manufacturing a hydrodynamic bearing assemblage comprising either a stationary bearing/rotating shaft or a rotating bearing/stationary shaft in a cost effective way. The most preferred material which we prefer using is essentially zirconia having 100% tetragonal crystal structure. We developed this 100% tetragonal zirconia by alloying zirconia with a number of secondary oxides as described in U.S. Pat. No. 5,336,282 and 5,358,913, hereby incorporated herein by reference.

The preferred ceramic powder mixture most preferred in the method of making zirconia-alumina composites of the invention includes a particulate alumina and particulate alloys of $ZrO_2$ and additional "secondary oxide" selected from: MgO, CaO, $Y_2O_3$, $Sc_2O_3$ and $Ce_2O_3$ and other rare earth oxides (also referred to herein as "Mg—Ca—Y—Sc—rare earth oxides"). Zirconia alloys useful in the methods of the invention have a metastable tetragonal crystal structure in the temperature and pressure ranges at which the ceramic article produced will be used. For example, at temperatures up to about 200° C. and pressures up to about 1000 MPa, zirconia alloys having, wherein zirconium oxide ahoy has a concentration of said secondary oxide of, in the case of $Y_2O_3$, about 0.5 to about 5 mole percent; in the case of MgO, about 0.1 to about 1.0 mole percent, in the case of $CeO_2$, about 0.5 to about 15 mole percent, in the case of $Sc_2O_3$, about 0.5 to about 7.0 mole percent and in the case of CaO from about 0.5 to about 5 mole percent, relative to the total of said zirconium oxide alloy, said compacting further comprising forming a blank, exhibit a tetragonal structure. Preferred oxides for alloying with zirconia are $Y_2O_3$, MgO, CaO, $Ce_2O_3$ and combinations of these oxides. It is preferred that the zirconia powder have high purity, greater than about 99.9 percent. Specific examples of useful zirconia alloys include: tetragonal structure zirconia alloys having from about 2 to about 5 mole percent $Y_2O_3$, or more preferably about 3 mole percent $Y_2O_3$. Examples of tetragonal structure zirconia alloys useful in the methods of the invention are disclosed in U.S. Pat. No. 5,290,332. Such zirconia alloys are described in that patent as being useful to provide a "net-shape" ceramic article: a ceramic article that is dimensionally true after sintering and therefore does not necessitate further machining prior to use in its intended working environment.

Referring again to FIG. 1, Step A' diagrammatically illustrates an alternative mixture of particulate zirconia alloy 104 and a particulate aluminum oxide 103. This alternative mixture can be achieved by mixing mechanically or chemically, for example, mixing by co-precipitation. The particulate mixture formed is from about 75 to 100 percent by weight (weight/total weight of particulate mixture) $Al_2O_3$, and preferably is from about 80 to about 99 percent by weight $Al_2O_3$, or more preferably is from about 80 to about 95 percent by weight $Al_2O_3$.

The grain and agglomeration sizes and distributions, moisture contents, and binders (if any) can be varied in both the alumina and the zirconia alloy, in a manner known to those skilled in the art. "Grain" is defined as an individual crystal, which may be within a particle, having a spatial orientation that is distinct from that of adjacent grains. "Agglomerate" is defined as an aggregation of individual particles, each of which may comprise multiple grains. In a particular embodiment of the invention, the grain and agglomeration sizes and distributions, and moisture contents of the alumina and the zirconia alloy are substantially the same and are selected as if the zirconia alloy was not going to be mixed with the alma, that is in a manner known to the art to be suitable for the preparation of a zirconium alloy article.

An example of convenient particulate characteristics for a particular embodiment of the invention is the following. Purity of $ZrO_2$ is preferably well controlled at 99.9 to 99.99 percent, that is, impurities are no more than about 0.1 to 0.01 percent. The grain size is from about 0.1 micrometers to about 0.6 micrometers. The average grain size is 0.3 micrometers. The distribution of grain sizes is 5–15 percent less than 0.1 micrometers, 40–60 percent less than 0.3 micrometers, and 85–95 percent less than 0.6 micrometers. The surface area of each individual grain ranges from about 10 to about 15 $m^2$/gram or is preferably 14 $m^2$/gram. Agglomerate size is from about 30 to about 60 micrometers and average agglomerate size is 40–60 micrometers. Moisture content is about 0.2 to 1.0 percent by volume of blank and is preferably 0.5 percent. The mixture of particulates is compacted in the presence of an organic binder.

Referring once again to FIG. 1, Step B, binders such as gelatin or polyvinyl ionomer or more preferably polyvinyl alcohol, are added to and mixed with the particulate mixture Y-TZP, 104 or a composite mixture of Y-TZP and alumina, 103, both illustrated in Step A and A', respectively. This can be achieved preferably by spray drying or ball milling prior to placement of the mixture in a compacting device.

Further, Step "B" also illustrates an alternative mixing process known to those who are proficient in the art as "compounding" in which the particulate mixture or mixtures are mixed with greater than 20% by weight of an organic binder such as paraffin at a temperature higher than the glass transition temperature of such binder for subsequent injection molding process, illustrated as Step C'.

COMPACTING

Figure 2:
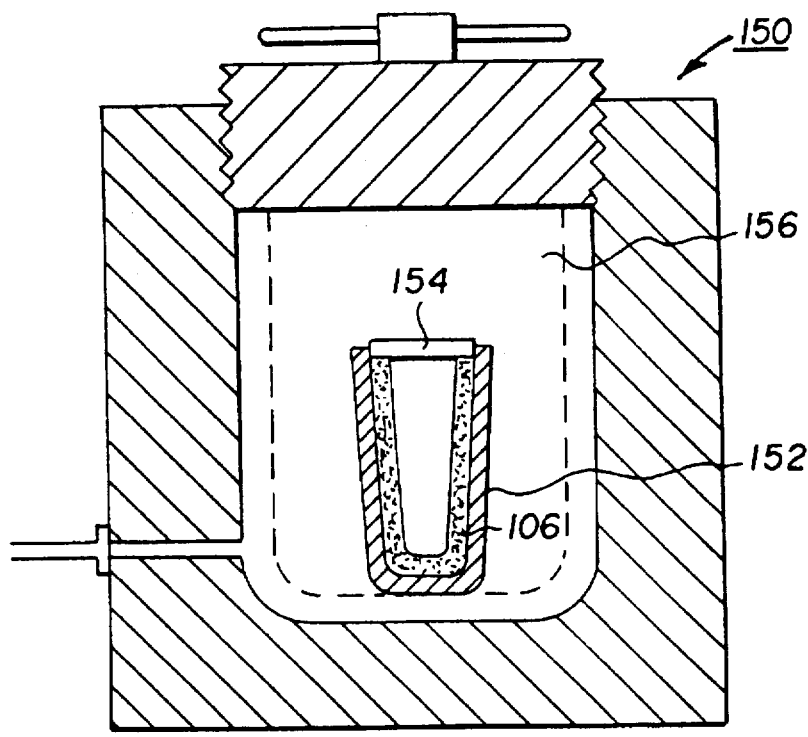
FIG. 2 is a schematic of a wet bag isostatic pressing system useful in the invention.

Turning now to compacting and more particularly to the process illustrated in FIG. 2, the particulate mixture 106 is cold compacted using preferably an isostatic press 150 to provide an unsintered blank 108 (FIG. 1). Unsintered blank 108 is alternatively referred to herein as a "green preform". It should be apparent to skilled artisans that a particular method of compacting the powder is not critical. The terms "cold compaction" and the like refer to compression of the particulate mixture at a temperature below glass transition or decomposition temperature of the organic binder. The green preform can be produced by such methods as cold uniaxial pressing, cold isostatic pressing, or cold extrusion. The particulate mixture is preferably subjected to uniform compacting forces in order to provide a unsintered blank which has a uniform density. Alternatively, near net-shape green blank 110' is generated using injection molding process.

The particulate mixture of zirconia alloy and alumina is compacted; heated to a temperature range at which sintering will occur; sintered, that is, maintained at that temperature range for a period of time; and then cooled. During all or part of sintering, the particulate mixture is in contact with dopant, as discussed below in detail. In FIG. 1, element 108 represents the product of both mixing and compaction, indicated by arrows "'B' & 'C'", respectively. Compaction and sintering are generally discussed herein as two consecutive operations, as indicated by steps "C" and "F", respectively, in FIG. 1, however, the invention is not limited to a particular sequence of compacting and sintering. For example, compaction and sintering can be simultaneous in a single operation or partial compaction can be followed by sintering and further compaction. The interim product of compacting and sintering operations is referred to herein as a "blank", which is illustrated as element 108 in FIG. 1. Blank 108 is at least partially compacted and is either unsintered or not fully sintered.

In a preferred method of the invention, the powder is cold compacted to provide a "green preform", which has a "green" density that is substantially less than the final sintered density of the ceramic article 116. It is preferred that the green density be between about 40 and about 65 percent of the final sintered density, or more preferably be about 60 percent of the final sintered density.

Figure 3:
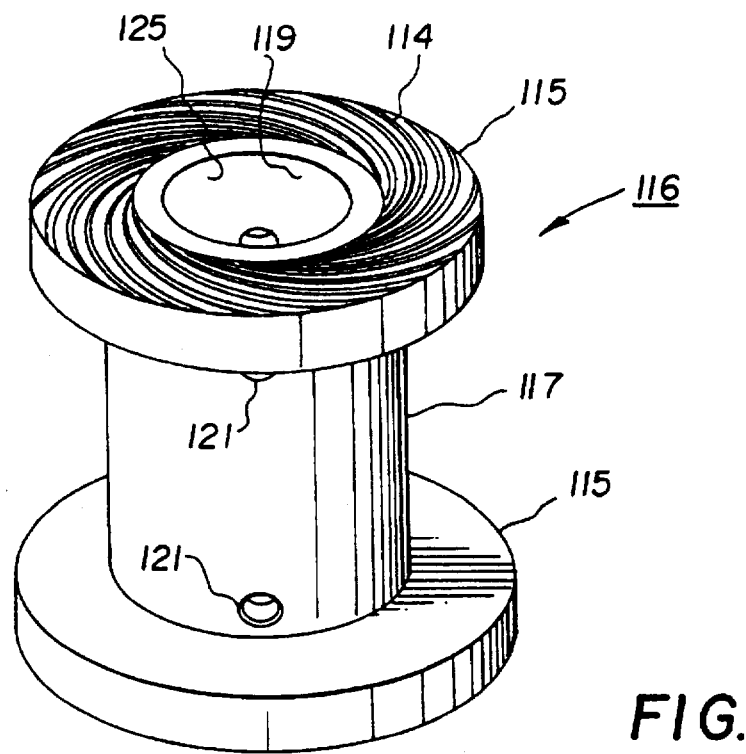
FIG. 3 is a perspective view of the hydrodynamic bearing made with the method of the invention.
Figure 4:
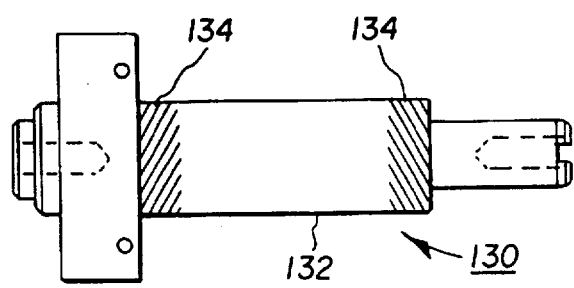
FIG. 4 is a plan end view of a typical spiraled shaft formed in the bearing assemblage and made with the method of the invention.

Referring to FIG. 2, the cold isostatic pressing of the powder was done by filling rubber mold 152 with powder 106 and keeping the mold 152 sealed by plate 154 in autoclave 156 of cold isostatic press 150. Mold 152 is then pressurized to about 25,000 pounds per square inch. Seal plate 154 may either be a metallic material, such as aluminum or steel or a hard rubber. Thus, in accordance with FIG. 1, Step D, near-net-shape bearing 110 is formed by green machining (as discussed below) of the blank 108 using carbide tools. In FIG. 3, spiral grooves 114 defining air channels are formed in flange portion 115 of net-shaped hydrodynamic bearing 110. Then the bearing 110 is sintered to full density using preferably sintering schedules described in U.S. Pat. No. 5,336,282 and 5,358,913, hereby incorporated herein by reference, and final precision machining were made to tight tolerances using diamond tools (FIG. 4). Referring to FIG. 3, again, the air channels 114 on the flange portion 115 of the bearing assemblage (for stationary bearing/rotating shaft the air channels are either on two opposing bearing faces or on one bearing face; for rotating bearing/stationary shaft the air channels are on the shaft body) were formed or engraved in the green ceramic near-net-shaped bearing 110. While various methods of forming air channels in the sintered ceramic bearing may be used, we prefer a novel technique which we developed comprising bead blasting through a polyester mask (prepared for example by the technique illustrated in FIG. 5), as described in details below.

SINTERING

Referring to FIG. 1, Step F, sintering of the green machined air bearing 110 is performed in a temperature range from about 1400° C. to about 1600° C., or more preferably about 1500° C. Preferable sintering times is in the range from about 1 hour to about 3 hours, or more preferably, about 2 hours. In a particular embodiment of the methods of the invention, the sintering peak temperature is 1500° C. and that temperature is maintained for about 2 hours. It is preferred that the pre-sintered bearing 110 be slowly heated to sintering temperature and slowly cooled so as to avoid undesirable dimensional changes, distortions and crack development. In an embodiment of the invention having a preferred sintering temperature of 1500° C., preferred temperature ramps during heating are: about 0.3° C./minute for room temperature to about 300° C., about 0.1° C./minute for about 300° C. to about 400° C., about 0.4° C./minute for about 400° C. to about 600° C., and about 1.5° C./minute for about 600° C. to about 1500° C. Preferred temperature ramps during cooling are: about 2° C./minute for about 1500° C. to about 800° C. and about 1.6° C./minute for about 800° C. to room temperature.

Alternatively, sintering may be achieved in the presence of a dopant selected from: MgO, FeO, ZnO, NiO, and MnO, and combination thereof, as discussed below in detail. The resulting alumina-zirconia ceramic article of the invention has a core of α-alumina or α-alumina and tetragonal zirconia alloy and a case of cubic spinel or cubic spinel along with cubic structure or cubic and monoclinic structure of zirconia alloy.

In the sintering of the methods of the invention, the dopant oxide selected from: MgO, FeO, ZnO, CoO, NiO, and MnO, and combination thereof, is in contact with the blank. It is preferred that the sintering result in a ceramic article 116 having a "full" or nearly theoretical density, and it is more preferred that the density of the ceramic article 116 be from about 99.5 to about 99.9 percent of theoretical density. Sintering is conducted in air or other oxygen containing atmosphere.

The methods of the invention are not limited to any particular sintering pressure and temperature conditions. Sintering can be performed at atmospheric pressure or alternatively a higher pressure can be used during all or part of the sintering to reduce porosity. The sintering is continued for a sufficient time period for the case of the article being sintered to reach a thermodynmnic equilibrium structure. An example of a useful range of elevated sintering pressures is from about 69 MPa to about 207 MPa, or more preferably about 100–103 MPa.

The exact manner in which the dopant is in contact with the blank during sintering is not critical, however, the "case", as that term is used herein, is limited to those areas of the blank in contact with the dopant during sintering. For example, a cubic spinel and tetragonal zirconia case can be readily produced by the methods of the invention on a portion of the overall surface of an article. It is not critical that the dopant be in contact with the blank during initial sintering, that is, sintering which does not result in an increase in density to full density.

Prior to observing the results of the Examples, the inventors had thought that they would be able to provide an explanation for conversion methods having any relative percentages of zirconia alloy and alumina. The inventors had expected results to be in accord with the concepts that the formation of cubic spinel is highly favored thermodynamically over the conversion of tetragonal zirconia to cubic zirconia and that the mechanism of action follows alumina concentration.

What has been discovered by the inventors is that, surprisingly, if the concentration of alumina in the blank 108 is from about 5 weight percent (relative to the total weight of zirconia and alumina) to about 50 weight percent, then the method of the invention produces an article having a case that is cubic spinel and tetragonal zirconia and a core that is α-alumina and tetragonal zirconia. During sintering, dopant, in effect, diffuses past tetragonal zirconia until all of the dopant has contacted and reacted, i.e. "partitioned", with alumina. In contrast, if the concentration of alumina in the blank is less than about 5 weight percent or greater than about 75 weight percent, then the method of the invention produces an article that has a case that is substantially composed of cubic spinel and cubic zirconia or cubic and monoclinic zirconia and a core that is co-alumina and tetragonal zirconia. During sintering, dopant does not, in effect, diffuse past tetragonal zirconia until all of the dopant has contacted and reacted with alumina; but rather reacts with alumina and tetragonal zirconia in the same vicinity, leaving alumina deeper within the blank unreacted.

These results are not compatible with a simple mechanism of action based on concentration alone. The results seen are compatible with a mechanism of action based upon an unpredictable alignment of several competing factors, such as rate of diffusion of dopant during sintering.

Shaping/Machining

It is known that ceramic parts can be fabricated to net-shape by the compaction processes such as dry pressing, injection molding, slip casting, and cold isostatic accompanied by green machining (FIG. 1, Step D). Green machining refers to the process of machining the ceramic particulate compact prior to densification. (For more general information refer to David W. Richardson, *Modern Ceramic Engineering: Properties, Processes and Use in Design*, 2nd Edition (1992). In this process, it is important that care be exercised to avoid overstressing the fragile material and producing chips, cracks, breakage, or poor surface. For instance, it is important that the ceramic billet is held rigidly, but with no distortion or stress concentration, during green machining. The part can be rigidly held by one of a numerous ways, including by simple mechanical gripping, by bonding or potting with a combination of beeswax and precision metal fixtures, the latter being preferred by the inventors. Once the ceramic billet is secured rigidly in a fixture, green machining can be accomplished in a variety of methods, including: turning, milling, drilling, form wheel grinding, and profile grinding. We prefer turning and profile grinding the billet during green machining to achieve the best results. Machining can be either dry or wet, depending on the binder present and whether or not the part has been bisque fired, i.e., fired at a high enough temperature to form bonds at particle-particle contact points, but not at a high enough temperature to produce densification.

Apart from green machining, a further precision machining step F, according to FIG. 1, of some of the surfaces is required to meet dimensional tolerances, achieve improved surface finish or remove surface flaws. Maintaining dimensional tolerances to the extent of few millionths of an inch or achieving surface finish to less than 10 microinches is not possible unless final machining after sintering is undertaken. We accomplished dimensional tolerances to the extent of ±100 millionth of an inch using dry pressing (uniaxial pressing) for parts of simple geometry and controlling the shrinkage by our patented sintering process. Precision machining is required when the part demands tolerances in certain dimensions less than 100 millionth of an inch and also to meet some dimensional tolerances such as roundness, perpendicularity, parallelness, etc. As contrasted with green machining, final precision machining of the sintered ceramic bearing requires diamond tooling and also sophisticated machines. Skilled artisans would know that milling, grinding, lapping and polishing are some effective procedures which are used in precision machining.

HYDRODYNAMIC BEARING 116

In FIG. 3, hydrodynamic bearing 116 is shown having spiral grooves 114 defining air channels arranged in at least one flange portion 115 in fluid communication with air inlet ports 121 formed in the body portion. Preferably, the air channels 114 are formed on a flange portion 115 of the ceramic bearing 116 or, alternatively, air channels 134 may be formed on a circumferential portion 132 of ceramic shaft 130 (FIG. 4). For stationary bearing/rotating shaft, the air channels are either on opposing faces of the bearing or on one bearing face as shown in FIG. 3. Alternatively, for rotating bearing/stationary shaft, the air channels 134 are on the shaft body 132, as illustrated in FIG. 4. Air channels provide air flow across the bearing surface which lubricates the bearing-shaft assembly. While the number of air inlet ports 121 may depend on the application, generally we prefer minimally two air inlet ports 121 in the bearing.

POLYESTER MASK FORMING

Figure 5:
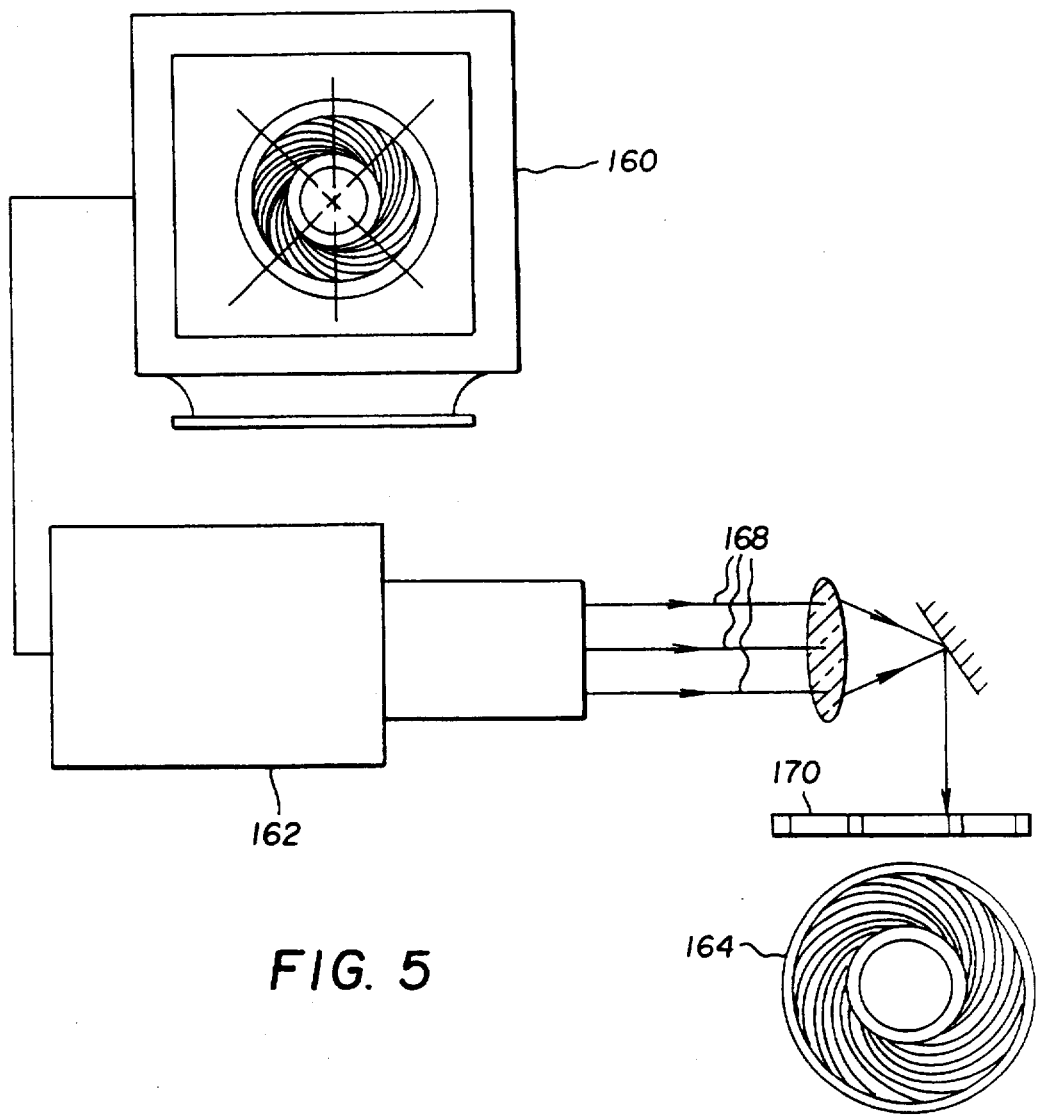
FIG. 5 is a schematic of a device for forming a mask on a polyester sheet useful for engraving air channels in the ceramic bearing made by the method of the invention.

According to the device illustrated schematically in the FIG. 5, data processing equipment, such as personal computer 160, is used to drive a $CO_2$ laser 162. In our invention, we preferred using an empirical mathematical model for generating the database profile for forming our preferred predetermined spiral engraved pattern. Thus, polar coordinates r and Θ for the engraved spiral pattern in the ceramic article conform with the below empirical mathematical equation in which various values of x, y, r and Θ were used, as illustrated in Table 1. According to the equation which defines the position of the leading edge $E_1$ of a spiral portion, $$\Theta = 153.0649 + 176.4505 \, ln \, (r)$$

wherein Θ defines the position of a spirally engraved portion relative to the r; and, r defines the distance from the center of the x, y coordinates to the leading edge of a spirally engraved portion comprising the spiral pattern. According to our invention, a corresponding trailing edge $E_t$ of a spirally engraved portion is rotatably about 11.43° from its corresponding leading edge $E_1$. Thus, according to the above equation, a preferred engraved spiral pattern useful in a ceramic hydrodynamic bearing assemblage is illustrated in FIGS. 3 and 5.

TABLE 1

| Coordinate No. | x | y | r | Θ |
|---|---|---|---|---|
| 1 | 0.420000 | 0.000000 | 0.420000 | 0.0000 |
| 2 | 0.430504 | 0.037956 | 0.432174 | 5.0386 |
| 3 | 0.437682 | 0.076680 | 0.444348 | 9.9372 |
| 4 | 0.441572 | 0.115872 | 0.456522 | 14.7034 |
| 5 | 0.442236 | 0.155251 | 0.468696 | 19.3441 |
| 6 | 0.439753 | 0.194558 | 0.480870 | 23.8659 |
| 7 | 0.434217 | 0.233553 | 0.493043 | 28.2746 |
| 8 | 0.425737 | 0.272016 | 0.505217 | 32.5757 |
| 9 | 0.414430 | 0.309745 | 0.517391 | 36.7744 |
| 10 | 0.400422 | 0.346557 | 0.529565 | 40.8755 |
| 11 | 0.383847 | 0.382287 | 0.541739 | 44.8833 |
| 12 | 0.364841 | 0.416786 | 0.553913 | 48.8022 |
| 13 | 0.343547 | 0.449922 | 0.566087 | 52.6357 |
| 14 | 0.320107 | 0.481577 | 0.578261 | 56.3878 |
| 15 | 0.294667 | 0.511649 | 0.590435 | 60.0616 |
| 16 | 0.267371 | 0.540046 | 0.602609 | 63.6605 |
| 17 | 0.238363 | 0.566693 | 0.614783 | 67.1874 |
| 18 | 0.207785 | 0.591523 | 0.626957 | 70.6451 |
| 19 | 0.175779 | 0.614483 | 0.639130 | 74.0363 |
| 20 | 0.142482 | 0.635528 | 0.651304 | 77.3635 |
| 21 | 0.108030 | 0.654624 | 0.663478 | 80.6292 |
| 22 | 0.072555 | 0.671745 | 0.675652 | 83.8354 |
| 23 | 0.036185 | 0.686874 | 0.687826 | 86.9844 |
| 24 | 0.000954 | 0.699999 | 0.700000 | 90.0781 |

The database profile for the preferred spiral pattern, as illustrated above, is inputted into a data processing system, such as personal computer 160, which communicates with the source of laser energy 162. Laser beams 163 from the source of laser energy 162 is then directed onto the polyester sheet 170 for engraving, in accordance with the database profile, the predetermined spiral pattern therein, thereby forming the polyester mask 164. Polyester mask 164 is then arranged in intimate contact using spray adhesive 166 (FIG. 6) with the ceramic article (or bearing) so as to avoid distortions in the spiral pattern imparted to the ceramic article. Alma grits (in a conventional sand blaster) are blasted onto the masked ceramic at 90 psi. For most effective results, the blasting nozzle is held at about 14 to 16 inches from the workpiece. The process of sand blasting to abrade hard surfaces is common to those who are familiar with the art and the machines are available commercially. The hard alumina grits, upon impinging on relatively more brittle surface than the plastic mask, removes the ceramic preferentially and thus forms the pattern. The plastic mask is so chosen such that it survives the very aggressive bead blasting process. We prefer either polyester or polyurethane sheets, thickness of which ranges from 5 to 10 mil. Other plastics like polycarbonate, mylar, etc. did not survive the rigor of grit blasting.

ENGRAVING

While skilled artisans will appreciate that various methods of engraving air channels into the ceramic surface may be used, for instance applying photoresist on the surface of the sintered ceramic, illuminating the pattern to be engraved, etching the exposed pattern away leaving exposed ceramic surface for engraving, engraving the surface using fine grits of diamond particles, and etching the remaining photoresist mask to obtain the air channel pattern on the ceramic body. We, however, prefer engraving the green ceramic bearing 110 by a novel method involving bead blasting through a specially formed polyester mask from a polyester sheet using the device illustrated schematically in FIG. 6. According to FIG. 6, the apparatus 180 for bead blasting includes a source 182 of ceramic grim 184, preferably alumina, a polyester mask 164 containing the spiral pattern 190, as described above. A plug 192, either metal or plastic, is arranged in a central opening (not shown) in the mask 164 and through the flange portion 115 and bearing body 117, as illustrated in FIG. 6. The apparatus 180 is substantially enclosed, with preferably a plastic shroud 119, to protect portions of the bearing 116 that are not being engraved by the alumina grits 184.

This invention is further clarified through the following examples:

EXAMPLES

Working Example 1

Zirconia ceramic powder (prealloyed with secondary oxides described in U.S. Pat. No. 5,336,282 and 5,358,913) were packed and sealed in molds made of rubber/polyurethane of 55 to 70 durometers of Shore hardness A (preferably 65 durometers). These molds were cold isostatically pressed in an autoclave at 15 to 30 kpsi (preferably 25 kilo pounds per square inch) to obtain billets of appropriate sizes in diameter and length.

Working Example 2

Same as in working Example 1, except that the zirconia alloy powder is premixed with polyvinyl alcohol binder.

Working Example 3

Same as in working Example 1, except that the zirconia alloy powder is premixed with acrylic binder.

Working Example 4

Preformed blanks produced by cold isostatically pressing are machined in their green state (i.e. before sintering) using carbide tools in lathe and milling machines. The cutting speeds in green machining of zirconia billets were maintained between 2800 and 3400 rpm (preferably at 32,000 rpm). In some cases, depending on the design, air inlet ports were drilled on the body of the bearings.

Working Example 5

Grooves defining air channels in the desired locations of the air bearing assembly were engraved by bead blasting through masks. The procedure for mask generation is illustrated in FIG. 5. Various plastic and metal masks were used to generate spiral pattern. Polyester and polyurethane masks performed the best to generate uniform spiral patterns on ceramic articles.

Working Example 6

The green machined and air channel engraved near-net-shaped air bearings are sintered following schedule described in U.S. Pat. Nos. 5,336,282 and 5,358,913. After sintering the bearings achieved full theoretical density of 6.05 gms/cc for yttria stabilized zirconia.

Working Example 7

The final precision machining of the bearing assembly and lapping of the flange portion containing the engraved spiral pattern were carried out using diamond tools. The surface finish of the bearing assembly including the air channels were <0.1 microns.

While the invention has been described with a certain degree of particularity, it is manifest that many changes may be made in the details of the construction and the arrangement of components without departing from the spirit and scope of the disclosure. It is understood that the invention is not limited to the embodiments set forth herein for purposes of exemplification, but is to be limited only by the scope of the attached claim or claims, including the full range of equivalency to which each element thereof is entitled.

We claim:

1. Method of making a hydrodynamic ceramic bearing, comprising the steps of:
   (a) providing ceramic powder comprising particulate zirconium oxide alloy said zirconium oxide alloy consisting essentially of zirconium oxide and a secondary oxide selected from the group consisting of MgO, CaO, $Y_2O_3$, $Sc_2O_3$, and rare earth oxides, said zirconium oxide alloy has a concentration of said secondary oxide, in the case of $Y_2O_3$, about 0.5 to about 5 mole percent; in the case of MgO, about 0.1 to about 1.0 mole percent, in the case of $CeO_2$, about 0.5 to about 15 mole percent, in the case of $Sc_2O_3$, about 0.5 to about 7.0 mole percent and in the case of CaO from about 0.5 to about 5 mole percent, relative to the total of said zirconium oxide alloy;
   (b) providing a mold for receiving and processing said ceramic powder;
   (c) compacting the ceramic powder in said mold to form a ceramic billet;
   (d) shaping said ceramic billet so as to form a near net-shaped ceramic bearing having opposing flange potions and a body portion between said opposing flange portions;
   (e) forming at least two air inlet ports in said body portion of said near net-shaped ceramic bearing;
   (f) forming air channels in at least one of said opposing flange portions, said air channels being in fluid communications with said air inlet ports;
   (g) sintering said near net-shaped ceramic bearing thereby forming a sintered ceramic bearing; and,
   (h) further shaping said sintered ceramic bearing.

2. The method recited in claim 1, wherein said step of compacting comprises cold isostatically pressing said ceramic powder in said mold.

3. The method recited in claim 2, wherein said cold isostatically pressing comprises the steps of:
   (a) maintaining said ceramic powder in a sterile environment; and,
   (b) pressurizing said filled mold to about 25,000 pounds per square inch.

4. The method recited in claim 1, wherein said step of shaping said sintered ceramic bearing in step (d) comprises green machining said ceramic bearing.

5. The method recited in claim 1, wherein the step of further shaping said sintered ceramic in step (g) comprises precision machining said sintered ceramic.

6. The method recited in claim 1, wherein the air channels formed in at least one of said flange portions of said bearing has a substantially spiral pattern.

7. The method recited in claim 4, wherein said green machining is achieved at a cutting speed in the range of about 2800 rpm to about 3400 rpm.

8. The method recited in claim 4, wherein said green machining achieved with at a cutting speed of about 3200 rpm.

9. The method recited in claim 1, wherein said mold comprises rubber having a hardness of about 55 to about 70 durometers of Shore hardness A.

10. The method recited in claim 1, wherein said compaction is achieved at a pressure of about 15 to about 30 kpsi.

* * * * *

UNITED STATES PATENT AND TRADEMARK OFFICE
CERTIFICATE OF CORRECTION

PATENT NO. : 5,730,928
DATED : March 24, 1998
INVENTOR(S) : Syamal K. Ghosh, et al.

It is certified that error appears in the above-identified patent and that said Letters Patent is hereby corrected as shown below:

Abstract, Line 6:
after "oxide and a" insert --secondary oxide selected from--.

Signed and Sealed this

Eighth Day of December, 1998

*Attest:*

BRUCE LEHMAN

*Attesting Officer*     *Commissioner of Patents and Trademarks*